United States Patent
Mogul et al.

(10) Patent No.: US 9,146,867 B2
(45) Date of Patent: Sep. 29, 2015

(54) METHODS AND APPARATUS TO ACCESS MEMORY USING RUNTIME CHARACTERISTICS

(75) Inventors: Jeffrey Clifford Mogul, Menlo Park, CA (US); Naveen Muralimanohar, Santa Clara, CA (US); Mehul A. Shah, Saratoga, CA (US); Eric A. Anderson, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 13/285,735

(22) Filed: Oct. 31, 2011

(65) Prior Publication Data

US 2013/0111147 A1 May 2, 2013

(51) Int. Cl.
*G06F 12/08* (2006.01)
*G06F 12/10* (2006.01)
*G06F 9/45* (2006.01)

(52) U.S. Cl.
CPC ........ *G06F 12/0802* (2013.01); *G06F 12/1027* (2013.01); *G06F 8/4442* (2013.01); *G06F 2212/502* (2013.01); *G06F 2212/6024* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 5,410,653 A * | 4/1995 | Macon et al. | 711/137 |
| 5,606,717 A | 2/1997 | Farmwald et al. | |
| 5,687,132 A | 11/1997 | Rao | |
| 5,883,849 A | 3/1999 | Shirley | |
| 6,012,106 A * | 1/2000 | Schumann et al. | 710/22 |
| 6,061,290 A | 5/2000 | Shirley | |
| 6,279,135 B1 | 8/2001 | Nguyen et al. | |
| 6,349,364 B1 * | 2/2002 | Kai et al. | 711/133 |
| 6,557,080 B1 * | 4/2003 | Burger et al. | 711/137 |
| 6,768,692 B2 | 7/2004 | Luk et al. | |
| 7,107,384 B1 * | 9/2006 | Chen et al. | 710/309 |
| 7,409,491 B2 | 8/2008 | Doblar et al. | |
| 7,493,450 B2 * | 2/2009 | Bearden | 711/137 |
| 7,533,212 B1 | 5/2009 | Doblar et al. | |
| 7,872,892 B2 | 1/2011 | MacWilliams et al. | |
| 7,882,407 B2 | 2/2011 | Abu-Rahma et al. | |
| 7,957,216 B2 | 6/2011 | Bains et al. | |
| 8,732,406 B1 * | 5/2014 | Pase et al. | 711/137 |
| 2004/0003179 A1 * | 1/2004 | Shirahige et al. | 711/137 |

(Continued)

FOREIGN PATENT DOCUMENTS

| | | |
|---|---|---|
| CN | 101251828 | 8/2008 |
| JP | 2010146145 A | 7/2010 |
| WO | 2011094437 A2 | 8/2011 |

OTHER PUBLICATIONS

J. Ahn et al., "Multicore DIMM: an Energy Efficient Memory Module with Independently Controlled DRAMs," IEEE Computer Architecture Letters, vol. 7(1), 4 pages, 2008.

(Continued)

*Primary Examiner* — Nathan Sadler
(74) *Attorney, Agent, or Firm* — Hanley Flight & Zimmerman, LLC (57) ABSTRACT

Example methods, apparatus, and articles of manufacture to access memory are disclosed. A disclosed example method involves receiving at least one runtime characteristic associated with accesses to contents of a memory page and dynamically adjusting a memory fetch width for accessing the memory page based on the at least one runtime characteristic.

12 Claims, 8 Drawing Sheets

(56) References Cited

U.S. PATENT DOCUMENTS

| | | | |
|---|---|---|---|
| 2005/0111284 A1 | 5/2005 | Akiyama et al. | |
| 2007/0214325 A1* | 9/2007 | Sasamoto | 711/137 |
| 2007/0233909 A1 | 10/2007 | Derr et al. | |
| 2007/0237020 A1 | 10/2007 | Davis et al. | |
| 2008/0010429 A1 | 1/2008 | Rao | |
| 2008/0229050 A1 | 9/2008 | Tillgren | |
| 2008/0256303 A1* | 10/2008 | Croxford et al. | 711/144 |
| 2009/0013211 A1 | 1/2009 | Vogt et al. | |
| 2009/0097851 A1 | 4/2009 | Tan et al. | |
| 2009/0198914 A1* | 8/2009 | Arimilli et al. | 711/146 |
| 2009/0254689 A1 | 10/2009 | Karamcheti et al. | |
| 2009/0282182 A1 | 11/2009 | Jeddeloh | |
| 2010/0080076 A1 | 4/2010 | Bains et al. | |
| 2010/0268886 A1* | 10/2010 | Frey et al. | 711/122 |
| 2011/0145496 A1 | 6/2011 | Whaley et al. | |
| 2011/0228600 A1 | 9/2011 | Breitwisch et al. | |
| 2011/0296118 A1 | 12/2011 | Carter et al. | |
| 2013/0111147 A1 | 5/2013 | Mogul et al. | |

OTHER PUBLICATIONS

E. Cooper-Balis et al., "Fine-Grained Activation for Power Reduction in DRAM," IEEE Micro, 14 pages, May 2010.

K. Sudan et al., "Micro-Pages: Increasing DRAM Efficiency with Locality-Aware Data Placement," Proc. ASPLOS, pp. 219-230, Mar. 13, 2010.

A. N. Udipi et al., "Rethinking DRAM Design and Organization for Energy-Constrained Multi-Cores," Proc. ISCA, pp. 175-186, Jun. 19, 2010.

D. H. Yoon et al., "Adaptive Granularity Memory Systems: A Tradeoff between Storage Efficiency and Throughput," Proc. ISCA, 12 pages, Jun. 4, 2011.

H. Zheng et al., "Mini-Rank: Adaptive DRAM Architecture for Improving Memory Power Efficiency," Proceedings of MICRO, pp. 210-221, 2008.

Vantrease, et al., "Light Speed Arbitration and Flow Control for Nanophotonic Interconnects," MICRO, 12 pages, Dec. 12, 2009.

"Heard at Hot Interconnects: Multicore SoCs may require optical interconnect," Reed Business Information, Aug. 27, 2008, [retrieved from http://www.edn.com/blog/Practical_Chip_Design/37757-Heard_at_Hot_Interconnects_Multicore_SoCs_may_require_optical_interconnect.php on Dec. 11, 2009], 2 pages.

Wikipedia, "Dynamic Random Access Memory," [retrieved from http://en.wikipedia.org/wiki/Dynamic_random-access_memory on Feb. 10, 2011], 15 pages.

Wikipedia, "Synchronous Dynamic Random Access Memory," [retrieved from http://en.wikipedia.org/wiki/Synchronous_dynamic_random_access_memory on Feb. 10, 2011], 12 pages.

T. J. Dell, "A Whitepaper on the Benefits of Chipkill-Correct ECC for PC Server Main Memory," Technical report, IBM Microelectronics Division, 24 pages, Nov. 19, 1997.

D. Locklear, "Chipkill Correct Memory Architecture," Technical Report, Dell, 4 pages, Aug. 2000.

Wikipedia, "Memristor," [retrieved from http://en.wikipedia.org/w/index.php?title=Memristor&oldid=328659258 on Dec. 4, 2009], 18 pages.

Bryan Gardiner, "Scientists Create First Memristor: Missing Fourth Electronic Circuit Element," [retrieved from http://www.wired.com/gadgetlab/2008/04/scientists-prov/ on Dec. 4, 2009], 3 pages.

Michael Brown, "White Paper: The Memristor," [retrieved from http://www.maximumpc.com/print/5814 on Dec. 4, 2009], 4 pages.

J. H. Ahn et al., "Future Scaling of Processor-Memory Interfaces," SC09 Nov. 14-20, 2009, Portland, Oregon, USA, 12 Pages.

\* cited by examiner

METHODS AND APPARATUS TO ACCESS MEMORY USING RUNTIME CHARACTERISTICS

BACKGROUND

Traditionally, memories such as dynamic random access memories (DRAMs) have been designed for low-cost and fast access time. However, gains in cost and access speed have been made via tradeoff decisions resulting in increased power-consumption. A DRAM is made of thousands of transistors organized to form bit cells that store bit-level information. When accessed together, combinations of bit cells can store meaningful and/or useful information. DRAM architectures include signal busses used to activate different combinations of bit cells for writing and/or reading information at addressable storage locations.

Some traditional DRAM architectures are structured such that a DRAM can be operated to quickly retrieve data stored at sequential address locations in response to a single data request and address provided by a processor or memory controller. For example, processors are typically configured to retrieve one or more entire cache lines from DRAM based on a single read request. In a traditional DRAM module, a single conventional read operation requires pre-charging an entire row of bitlines in each DRAM chip of the DRAM module. Each pre-charged row typically corresponds to multiple cache lines.

DETAILED DESCRIPTION

Example methods, apparatus, and articles of manufacture disclosed herein may be used to perform memory accesses using dynamic memory fetch widths (MFWs). Unlike known memory access techniques that use fixed memory fetch widths to retrieve information from memory devices, example techniques disclosed herein use dynamic MFWs that can be adjusted dynamically during operation of a processor and memory controller to more efficiently fetch contents from memory device(s). That is, examples disclosed herein can be used to set dynamic MFWs during processor system operation to control how data is read from memory cells. For example, if a memory request wants to activate a single cache line, the dynamic MFW can be set equal to the length of the cache line so that the memory controller will not overfetch more contents from a memory device than requested. In this manner, dynamic MFWs can be used to access memory contents with more time efficiency and energy efficiency than known techniques by substantially reducing (e.g., eliminating) overfetching from memory devices.

Traditional dynamic random access memory (DRAM) designs use row buffers to capture locality in memory references. To increase performance, while maintaining or decreasing physical space requirements, some traditional DRAM architectures are structured such that a DRAM can be operated to quickly retrieve data stored at sequential address locations in response to a single data request and address provided by a processor or memory controller. However, such data access techniques typically result in retrieving more information from a memory than is necessary and, thus, unnecessarily consume more power by activating portions of memory that may not otherwise be needed. For example, processors are typically configured to retrieve one or more entire cache lines from DRAM based on a single read request. A cache line refers to the number of bits or bytes that make up the width of a processor's cache memory (e.g., a 32-byte cache line, a 64-byte cache line, a 128-byte cache line, etc.). In a traditional DRAM module, a single conventional read operation requires activating an entire row of bitlines in each DRAM chip of the DRAM module. Each activated row typically corresponds to multiple cache lines. Thus, even when a processor requests a single cache line, internal DRAM logic must activate all of the bitlines of the DRAM chip row(s) that store(s) the requested cache line. Such known access techniques, achieve fast access performance when there is high locality of adjacently stored information that is needed by the requesting processor in a consecutive manner. That is, by activating an entire row, every cache line stored in that row can be read-out to the requesting processor during consecutive low-latency read cycles (e.g., DRAM burst-mode reads or page-mode reads). While there is some initial overhead delay to read-out the first cache line, each subsequent consecutive cache line can be read out with relatively lower latency from a row buffer because the row buffer already stores the data from the activated row and access to the row buffer is relatively faster than reading from memory cells. However, if the requesting processor ends up using only one cache line from the activated row, significant energy is wasted using these known techniques, especially when memory access locality is reduced as core, thread, and socket counts increase in processor operations.

Multi-core processing decreases short-term memory locality. For example, fetching an 8 kilobyte (KB) row buffer to fulfill just one 64 byte (B) cache line request wastes a significant amount of energy and time and, thus, can create queuing delays. Examples disclosed herein use dynamic MFWs in connection with multiple-subarray access (MSA) to reduce or eliminate overfetch while usefully controlling the amount of memory contents fetched based on an amount of locality associated with such memory contents. That is, when low locality exists in requested memory contents, the dynamic MFW can be decreased to avoid inefficient overfetch. However, when high locality exists in requested memory contents, the dynamic MFW can be increased with low or no overfetch.

In some examples, the dynamic MFW can be determined by one or more memory controllers and/or one or more processors in a multi-core processor system. In some examples, the dynamic MFW can be determined by an operating system (OS) and/or applications based on information available to the OS and/or the applications regarding amounts of locality for different memory accesses. In this manner, the OS and/or the applications can be written to improve (e.g., optimize) their memory accesses based on factors specific to their execution environment.

Some disclosed example methods, apparatus, and/or articles of manufacture to dynamically determine a MFW involve receiving at least one runtime characteristic associated with accesses to contents of a memory page and dynamically setting a memory fetch width for accessing the memory page based on the at least one runtime characteristic. In some examples, the dynamic adjustment of the memory fetch width is performed by at least one of a memory controller, an operating system, or an application. In some examples, the at least one runtime characteristic is a filled and non-accessed micro-buffer count, and a memory reference count is also received. In such examples, the filled and non-accessed micro-buffer count is indicative of a quantity of data units (e.g., bits, bytes, words, cache lines, etc.) filled in a micro-buffer and not accessed from the micro-buffer, and the memory reference count is indicative of a quantity of fetches from the memory page. In such examples, the dynamic setting of the memory fetch width is performed by determining a ratio of a filled and non-accessed micro-buffer count to a memory reference count for a memory page. In such examples, if the ratio is greater than a first threshold, a dynamic MFW is decreased (e.g., divided by two), and if the ratio is less than a second threshold, the dynamic MFW is increased (e.g., multiplied by two). In some examples, before determining the ratio, it is determined whether the MFW of the memory page is set to a static value, and the ratio is determined only when the MFW of the memory page is not set to the static value. In some such examples, the static value is settable by an operating system or an application executing on a processor in communication with the memory controller. In some examples, the filled and non-accessed micro-buffer count, the memory reference count, and the MFW are stored in a translation lookaside buffer table entry corresponding to the memory page. In some examples, when the MFW is decreased and if the MFW is less than a threshold (e.g., a minimum) allowable MFW (min-MFW), the MFW is set to the threshold (e.g., a minimum) allowable MFW (minMFW). In some examples, when the MFW is increased and if the MFW is greater than a threshold (e.g., a maximum) allowable MFW (maxMFW), the MFW is set to the threshold (e.g., a maximum) allowable MFW (maxMFW).

Some disclosed example methods, apparatus, and/or articles of manufacture to access memory using a dynamic MFW involve a parameter modifier to, if a requested cache line is in a currently open memory page, update a memory reference count for the open memory page and, if the requested cache line is not in the currently open page, update a filled and non-accessed micro-buffer count. In such examples, the memory reference count is indicative of a quantity of fetches from the open memory page, and the filled and non-accessed micro-buffer count is indicative of a quantity of data units (e.g., bits, bytes, words, cache lines, etc.) filled in a row buffer of a memory and non-accessed from the row buffer. In such examples, a memory interface is provided to use a dynamic MFW to retrieve the requested cache line from a second memory page when the requested cache line is not in the currently open page. In some examples, the memory interface is also configured to release a portion of a row buffer when the requested cache line is not in the currently open memory page, and load the requested cache line from the second memory page into the portion of the row buffer. In such examples, a bit length of the portion of the row buffer is equal to the dynamic MFW. In some examples, the parameter modifier is to update the filled and non-accessed micro-buffer count based on a tag value stored in a data structure of a memory controller in association with an identifier of the currently open memory page. In some examples, a processor interface is provided to communicate with a processor and to retrieve the dynamic MFW set by an OS and/or an application when executed on the processor. In some examples, a parameter interface is provided to communicate the memory reference count and the filled and non-accessed micro-buffer count to a processor. In some examples, a parameter interface is provided to access the memory reference count and the filled and non-accessed micro-buffer count in a data structure of a memory controller.

Figure 1:
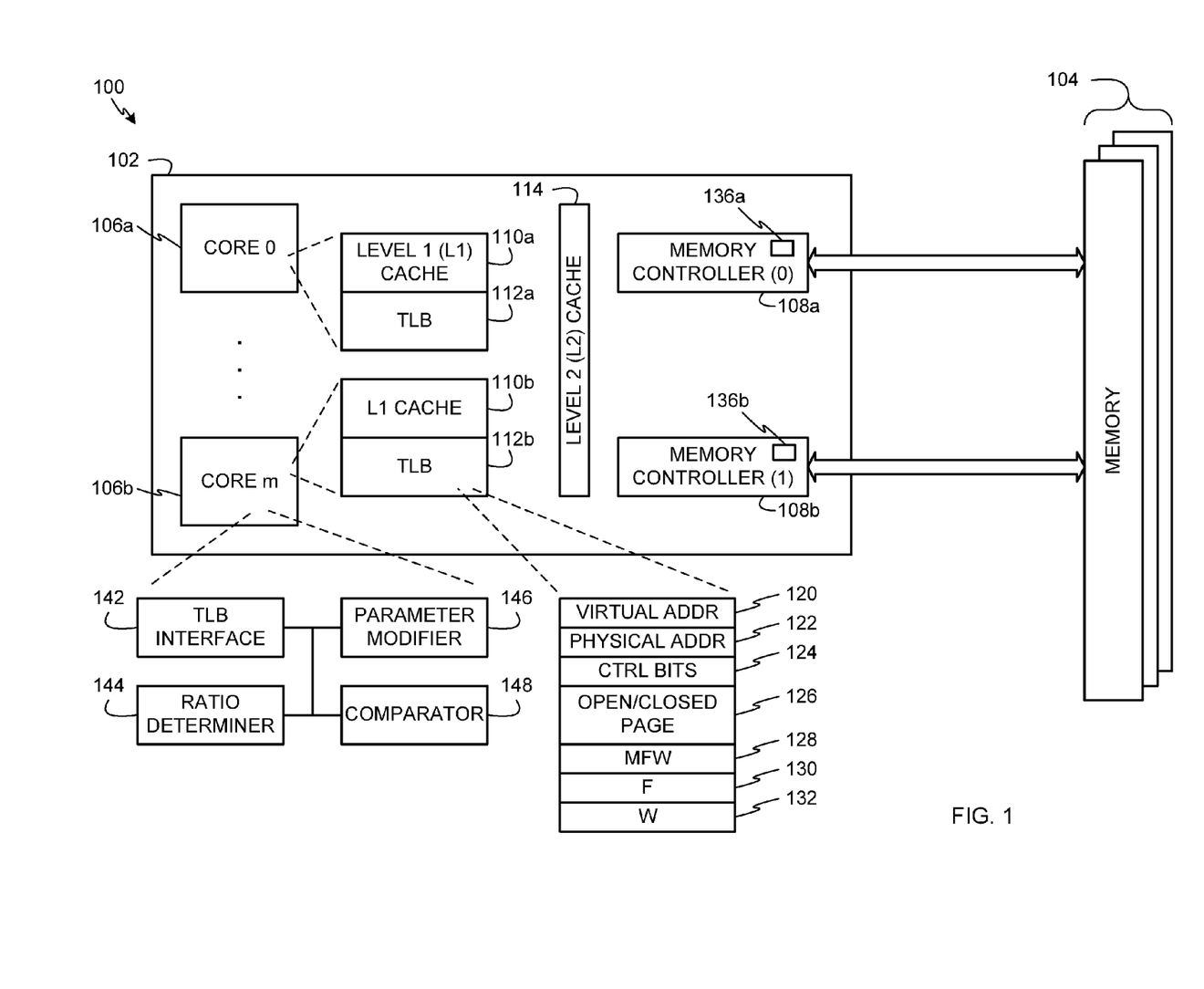
FIG. 1 illustrates an example processor system that can be used to execute example instructions of FIGS. 6, 7A, and 7B to determine and use dynamic memory fetch widths (MFWs) to access memory contents in accordance with examples disclosed herein.

FIG. 1 illustrates an example processor system 100 that can be used to execute the example instructions of FIGS. 4, 5A, and 5B to determine and use dynamic MFWs to access memory contents in accordance with examples disclosed herein. In the illustrated example, the processor system 100 includes a multi-core processor 102 in communication with one or more memory devices 104. Examples disclosed herein are described in connection with the memory device(s) 104 being implemented using SDRAMs. However, one or more of the memory devices 104 may be implemented using other type(s) of memories. In some examples, the memory device(s) 104 implement main memory. In other examples, the memory device(s) 104 implement volatile, intermediate memory that temporarily store(s) data from long-term mass memory such as magnetic, solid state, and/or optical disk drives. In some examples, such a storing arrangement is used when data access speeds of the memory device(s) 104 are relatively faster than data access speeds of the long-term mass memory.

The multi-core processor 102 of the illustrated example includes multiple cores represented as core 0 106a through core m 106b. In addition, the example multi-core processor 102 includes multiple memory controllers represented as memory controller (0) 108a through memory controller (1) 108b. In the illustrated example, each of the cores 106a-b includes a respective level 1 (L1) cache 110a-b and a respective translation lookaside buffer (TLB) 112a-b. The multi-core processor 102 of the illustrated example also includes a level 2 (L2) cache 114. Although examples disclosed herein are described in connection with the multi-core processor 102 having multiple cores 106a-b and multiple memory controllers 108a-b, examples disclosed herein may additionally or alternatively be implemented in connection with single-core processor systems having one memory controller.

In the illustrated example, the L1 caches 110a-b store memory contents frequently and/or recently accessed by the respective cores 106a-b. When memory contents for memory requests by the cores 106a-b are not found in the respective L1 caches 110a-b, the L2 cache 114 is checked to determine if the requested memory contents are cached therein. If the requested memory contents are not cached in the L2 cache 114, a memory access request is sent to one or more of the memory controllers 108a-b to retrieve the requested contents from the memory 104. In some examples, the caches 110a-b and 114 are inclusive meaning that when data is retrieved from the memory 104, it is written to all levels of cache to reduce the number of accesses to the memory 104.

In the illustrated example, the TLBs 112a-b are substantially similar or identical. Each TLB 112a-b of the illustrated example stores memory page information including virtual addresses 120, physical addresses 122, control bits 124, open/closed page statuses 126, MFWs 128, memory reference counts (Fs) 130, and/or filled and non-accessed micro-buffer counts (Ws) 132. In the illustrated example, the virtual addresses 120 indicate virtual addresses used by the cores 106a-b to reference memory pages, the physical addresses 122 indicate the physical addresses of the memory pages in the memory 104. The TLBs 112a-b of the illustrated example store virtual addresses in association with corresponding physical addresses to enable accessing corresponding memory contents at physical addresses in the memory 104 based on virtual addresses used by the cores 106a-b. The control bits 124 facilitate memory page accesses.

The open/closed page statuses 126 of the illustrated example indicate when corresponding memory pages are open and when they are closed. The MFWs 128 of the illustrated example indicate MFW values dynamically set for corresponding memory pages. The MFWs 128 of the illustrated example are used to dynamically control the size or width of data to be retrieved from a memory page and is adjustable dynamically during runtime of the example processor system 100 as disclosed herein.

In examples disclosed herein, the memory reference counts (Fs) 130 and the filled and non-accessed micro-buffer counts (Ws) 132 are runtime characteristics of accesses to corresponding memory pages. In the illustrated examples disclosed herein, these runtime characteristics are used to dynamically determine and/or adjust the MFWs 128 to dynamically control the size or width of data to be retrieved from corresponding memory pages. The memory reference counts (Fs) 130 of the illustrated example are indicative of quantities of fetches from corresponding memory pages. If contents from a particular memory page are highly frequently accessed, the memory reference count (F) for that memory page will be relatively larger than for a memory page having contents less frequently accessed.

The filled and non-accessed micro-buffer counts (Ws) 132 of the illustrated example are indicative of quantities of data units (e.g., bits, bytes, words, cache lines, etc.) filled in micro-buffers of the memory 104 for respective memory pages and not accessed from the micro-buffers. That is, if memory contents (e.g., a cache line) are retrieved from memory cells of the memory 104 and stored in micro-buffers (e.g., micro-buffer(s) 514 of FIG. 5) but are not accessed from the micro-buffers for one or more of the cores 106a-b, resources have been wasted to retrieve such memory contents from memory cells of the memory 104. As such, the non-accessed cache lines buffered in the micro-buffers are considered wasted. Whenever such a wasted retrieval is detected for a memory page, a corresponding one of the filled and non-accessed micro-buffer counts (Ws) 132 is increased by the number of data units (e.g., a quantity of cache lines or a quantity of another selected data unit) not accessed from the micro-buffers.

In the illustrated example, the memory controller 108a is provided with an apparatus 136a, and the memory controller 108b is provided with an apparatus 136b. The apparatus 136a-b of the illustrated example are substantially similar or identical to one another and are provided to monitor fetches and accesses of memory contents. That is, in the illustrated example, the apparatus 136a-b update memory reference counts (Fs) and filled and non-accessed micro-buffer counts (Ws) for respective memory pages and send the memory reference counts (Fs) and the filled and non-accessed micro-buffer counts (Ws) to the respective core(s) 106a-b for storing as the memory reference counts (Fs) 130 and the filled and non-accessed micro-buffer counts (Ws) 132 of the corresponding TLB(s) 112a-b. In some examples, the apparatus 136a-b determine dynamic MFWs for respective memory pages based on the memory reference counts (Fs) and the filled and non-accessed micro-buffer counts (Ws) and send the dynamic MFWs to the cores 106a-b. In other examples, OS(s) and/or application(s) executing on the core(s) 106a-b determine the dynamic MFWs 128 for respective memory pages based on the memory reference counts (Fs) 130 and the filled and non-accessed micro-buffer counts (Ws) 132, and the core(s) 106a-b send the MFW(s) 128 to the memory controller(s) 108a-b in corresponding memory access requests so that the memory controllers 108a-b access the memory 104 using selective activation of only portion(s) of memory arrays based on the dynamic MFWs.

In some examples, the MFWs 128 can be set to a fixed or static status indicating that the MFWs 128 should not be modified or changed. In such examples, the fixed or static status can be indicated by a particular binary code used only to indicate such a fixed or static status. In such examples, when an OS or an application encounters an MFW 128 with the fixed or static status code, the OS and/or application detect the code and determine that the MFW 128 should not be updated. In some examples, a user, an OS and/or an application can set an MFW 128 to fixed or static mode when such a mode is identified to optimize memory accesses for a particular type of performance and/or software/hardware compatibility. In other examples, such a fixed or static mode may be selected when it is desired for hardware/software to not autonomously adjust (e.g., optimize) memory accesses.

In the illustrated example of FIG. 1, to analyze the memory reference counts (Fs) 130 and the filled and non-accessed micro-buffer counts (Ws) 132 and determine the MFWs 128, the core 106b is provided with an example TLB interface 142, an example ratio determiner 144, an example parameter modifier 146, and an example comparator 148. In the illustrated example, the TLB interface 142, the ratio determiner 144, the parameter modifier 146, and the comparator 148 may be implemented as one or more logic circuits in the core 106b and/or machine readable instructions executable by the core 106b. In some examples, the TLB interface 142, the ratio determiner 144, the parameter modifier 146, and the comparator 148 operate at the direction of logic circuit(s) in the core 106b and/or at the direction of an OS and/or one or more application(s) executing on the core 106b to determine the MFWs 128. In the illustrated example, the MFWs 128 are dynamically determined in the core 106b by logic circuit(s), by the OS, and/or by one or more application(s). In other examples, the MFWs 128 are dynamically determined in the memory controllers 136a-b. Although the TLB interface 142, the ratio determiner 144, the parameter modifier 146, and the comparator 148 are shown only in the core 106b, the core 106a also includes substantially similar or identical logic circuits and/or machine readable instructions.

In the illustrated example, the TLB interface 142 is provided to access (e.g., read and/or write) information in the TLB 112b such as the virtual addresses 120, the physical addresses 122, the control bits 124, the open/closed page statuses 126, the MFWs 128, the memory reference counts (Fs) 130, and the filled and non-accessed micro-buffer counts (Ws) 132. In the illustrated example, the ratio determiner 144 is provided to determine ratios of filled and non-accessed micro-buffer counts (Ws) 132 to respective memory reference counts (Fs) 130 (e.g., W:F ratios) of respective memory pages. In the illustrated example, the parameter modifier 146 is provided to modify the MFWs 128, the memory reference counts (Fs) 130, and the filled and non-accessed micro-buffer counts (Ws) 132. The comparator 148 of the illustrated example is provided to compare values such as comparing the MFWs 128 to threshold(s) (e.g., maximum and minimum values), comparing the W:F ratios to threshold value(s), and/or performing other comparisons.

While an example manner of implementing the TLB interface 142, the ratio determiner 144, the parameter modifier 146, and the comparator 148 is illustrated in FIG. 1, one or more of the elements, processes and/or devices illustrated in FIG. 1 may be combined, divided, re-arranged, omitted, eliminated and/or implemented in any other way. Further, the TLB interface 142, the ratio determiner 144, the parameter modifier 146, and the comparator 148 of FIG. 1 may be implemented by hardware, software, firmware and/or any combination of hardware, software and/or firmware. Thus, for example, any of the TLB interface 142, the ratio determiner 144, the parameter modifier 146, and the comparator 148 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus and/or system claims of this patent are read to cover a purely software and/or firmware implementation, at least one of the TLB interface 142, the ratio determiner 144, the parameter modifier 146, and/or the comparator 148 is hereby expressly defined to include a tangible computer readable medium such as a memory, DVD, CD, etc. storing the software and/or firmware. Further still, the example core 106b illustrated in FIG. 1 may include one or more elements, processes and/or devices in addition to, or instead of, those illustrated in FIG. 1, and/or may include more than one of any or all of the illustrated elements, processes and devices.

Figure 2:
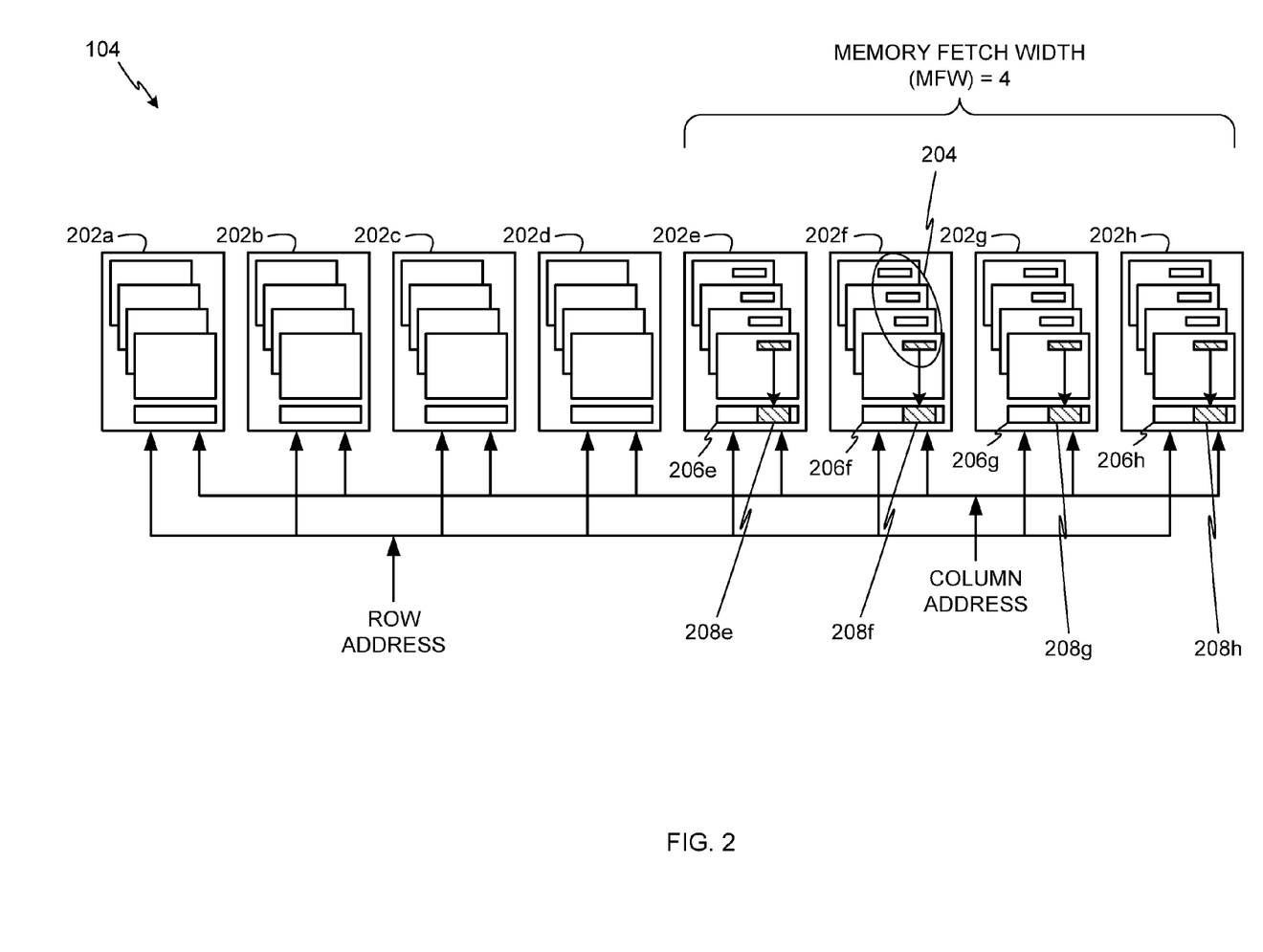
FIG. 2 illustrates an example manner of accessing a dynamic random access memory (DRAM) device using dynamic MFWs.

FIG. 2 illustrates an example manner of accessing the memory 104 of FIG. 1 using dynamic MFWs. The memory 104 is illustrated in FIG. 2 as a DRAM dual inline memory module (DIMM) having eight DRAM chips or arrays 202a-h. Access to the memory 104 of the illustrated example is performed using dynamic MFWs such that the quantity of the chips 202a-h activated can differ between memory accesses. For example, if the dynamic MFW is set to four (i.e., dynamic MFW=4), the four chips 202e-h are activated as shown in FIG. 2. In addition, in the illustrated example, only portions 204 of rows are selectively activated within banks of each of the four chips 202e-h. In the illustrated example, a requested one of the portions 204 in each chip 202e-h is loaded into a respective chip row buffer 206e-h and is shown as buffered row portion 208e-h. When output to a requesting memory controller (e.g., one of the memory controllers 108a-b of FIG. 1), the buffered row portions 208e-h are concatenated to form a requested cache line.

If a dynamic MFW is set to fewer than four (4) during a subsequent access, less than the four chips 202e-h are activated, and when the dynamic MFW is set to greater than four (4) during a subsequent access, more than the four chips 202e-h are activated. That is, the number of activated chips 202a-h is equal to the dynamic MFW. In examples in which the dynamic MFW is set to eight (8) or more, all eight of the chips 202a-h are activated.

In some examples, an OS selects a default setting for a memory page's dynamic MFW (e.g., the default MFW value could be selected on a per-application or per-process basis) and then adjusts corresponding memory page's dynamic MFW using per-page hardware metrics (e.g., the memory reference counts (Fs) 130 and the filled and non-accessed micro-buffer counts (Ws) 132 of the TLBs 112a-b) provided in a feedback loop. In such examples, the OS uses the metrics (e.g., the memory reference counts (Fs) 130 and the filled and non-accessed micro-buffer counts (Ws) 132 of the TLBs 112a-b) to determine when dynamic MFW values of respective memory pages lead to excessive overfetching or insufficient locality (e.g., filled and non-accessed micro-buffers). When overfetching or insufficient locality is detected for a particular memory page, the OS of the illustrated example can change the dynamic MFW for that memory page. In some examples, the OS is provided with an application programming interface (API) to allow applications executing in the OS environment to analyze and change dynamic MFW values based on the metrics (e.g., the memory reference counts (Fs) 130 and the filled and non-accessed micro-buffer counts (Ws) 132 of the TLBs 112a-b).

Examples disclosed herein are implemented using an open-page policy. In some examples, having smaller MFWs significantly improves parallelism in memory and reduces the probability of conflicts. As a result, relatively few accesses incur increased delay due to precharge operations being in the critical path.

Figure 3:
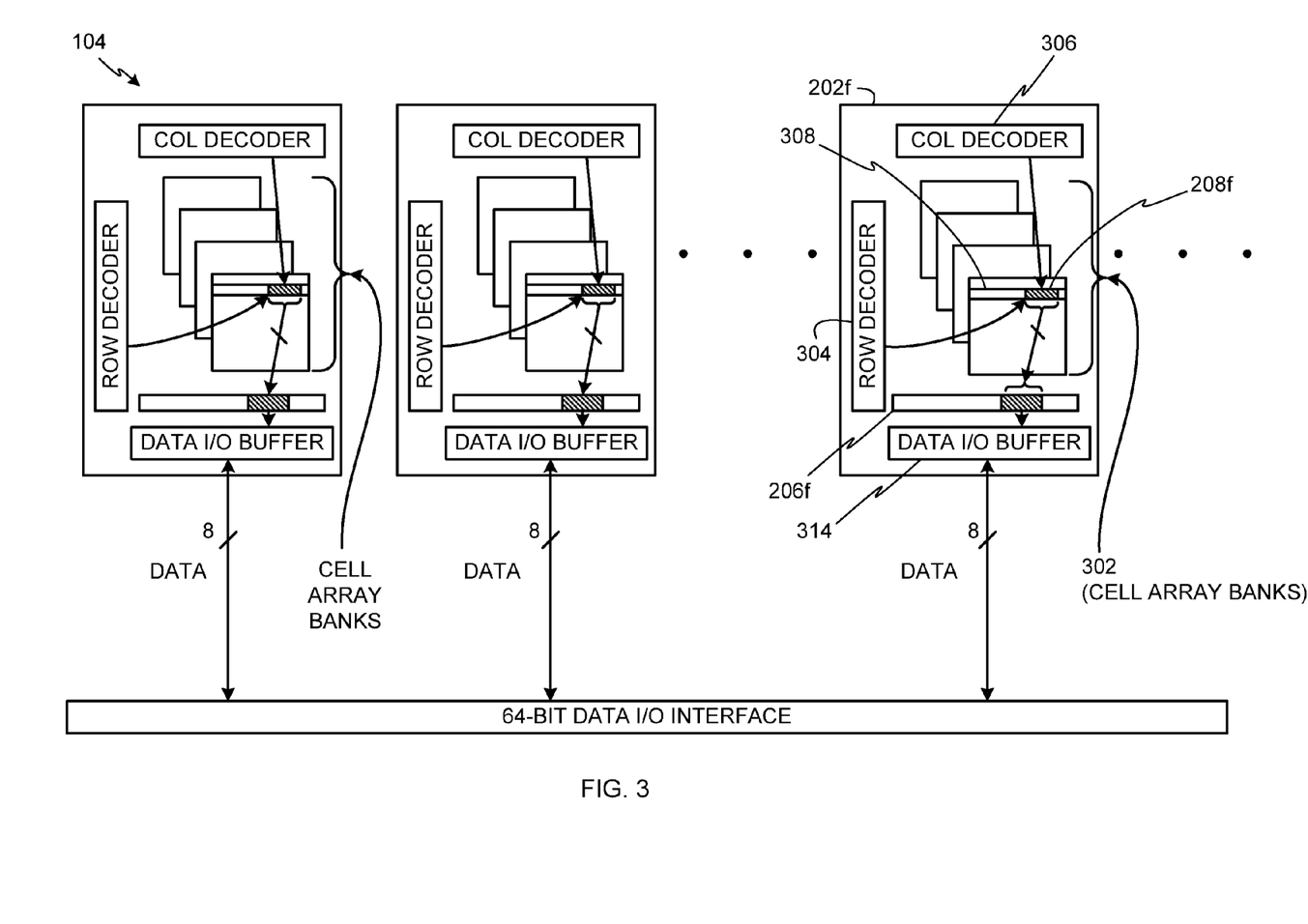
FIG. 3 is a diagram of the DRAM configuration of FIG. 2 showing row and column address decoders working cooperatively to selectively activate specific segments of rows in DRAM bit cell array banks.

Turning to FIG. 3, the DRAM chip 202f is shown in detail with a plurality of bit cell array banks 302 that store information, a row decoder 304, and a column decoder 306. Each bit cell array bank 302 is arranged as rows of bit cells that store information. A row 308 is shown in one of the banks 302 and is also referred to herein as a wordline. In the illustrated example, the row decoder 304 receives the row address from a memory controller (e.g., one of the memory controllers 108a-b of FIG. 1), and the column decoder 306 receives the column address from the memory controller (e.g., one of the memory controllers 108a-b of FIG. 1). The row decoder 304 and the column decoder 306 then concurrently decode their respective address information to selectively activate a portion of the row 308 (or wordline) within a particular one of the cell array banks 302 containing the requested information. The activated portion of the row 308 is shown as the portion 208f of FIG. 2 and denoted herein as a wordline segment 208f, which is a portion of the row 308 that is activatable without requiring activation of other portions of the same row 308. In the illustrated example of FIG. 3, separate wordline segments of respective ones of the DRAM chips 202-a-h can be activated and read out as discussed below with reference to the DRAM chip 202f illustrated in FIG. 4. In this manner, the bits read out from the separate SDRAM chips 202-a-h can be concatenated to form a cache line requested by a memory controller (e.g., one of the memory controllers 108a-b of FIG. 1). In the illustrated example of FIG. 3, a 64-byte cache line is formed by concatenating 8-bit data outputs from each of the DRAM chips 202-a-h to form eight 64-bit cache line portions or segments that are subsequently concatenated to form the entire cache line.

When the wordline segment 208f is active, its bits are loaded into the row buffer 206f for output via data I/O buffer 314. The wordline segment 208f can include a number of bits equal to or greater than the width of the data I/O bus of the DRAM chip 202f. In the illustrated example, each of the DRAM chips 202a-h (FIG. 2) has an 8-bit data I/O bus. Thus, for a cache line that is 64 bytes wide, each activated wordline segment (the wordline segment 208f) of each DRAM chip 202a-h stores a portion or segment of a requested 64-byte cache line. When each of the DRAM chips 202a-h retrieves 8 bits from its respective wordline segment, the 8 bits from each of the DRAM chips 202a-h are concatenated to form 64 bits output by the memory 104. This process can be repeated until the DRAM chips 202a-h have provided the entire 64-byte cache line. In such an example implementation, each of the DRAM chips 202a-h stores a respective 8 bytes of the 64-byte cache line.

Figure 4:
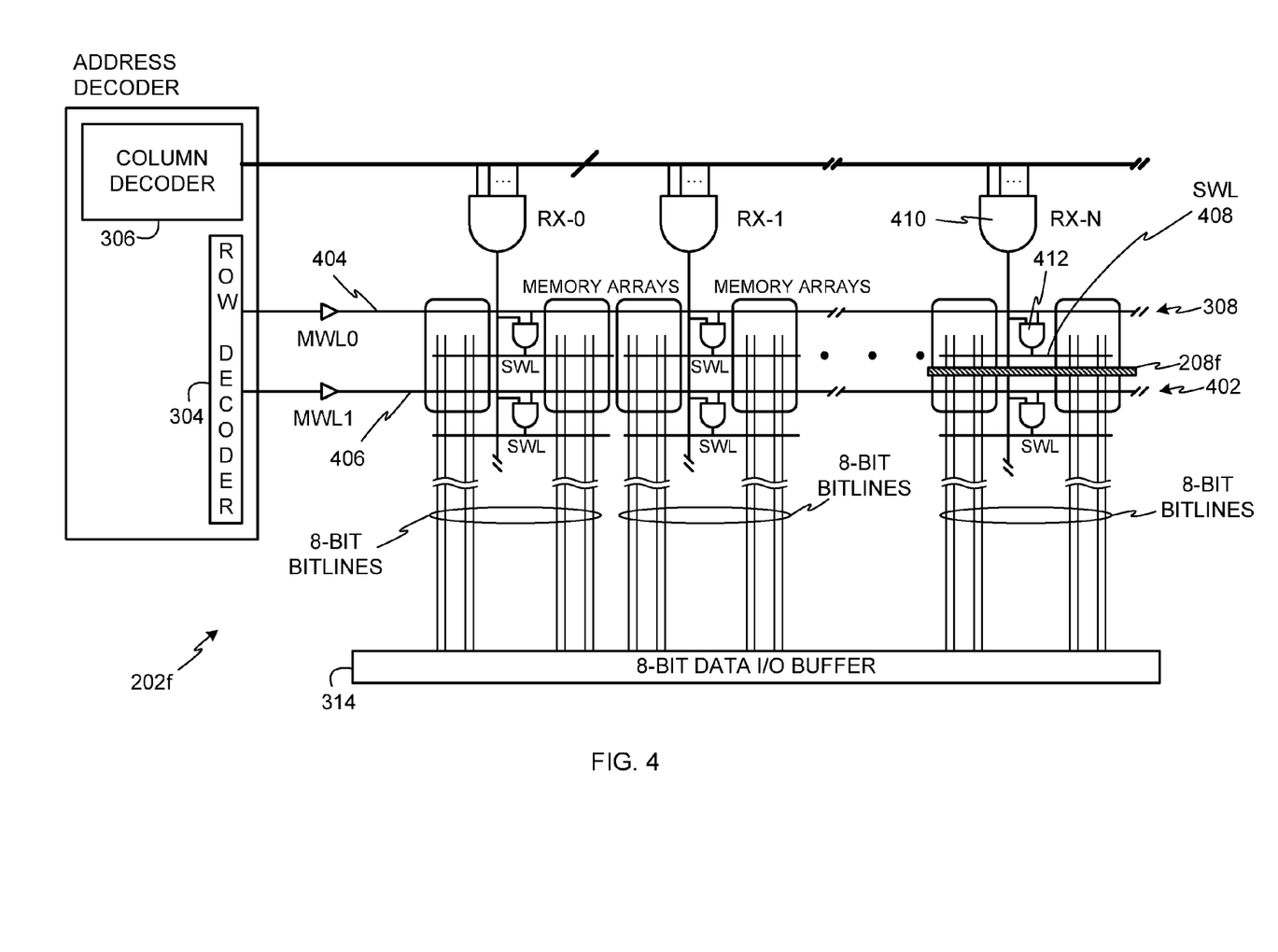
FIG. 4 is a detailed diagram of one of the DRAM chips of the DRAM configuration of FIGS. 2 and 3 showing row and column address decoders of the DRAM chip working cooperatively to selectively activate particular bitlines of the DRAM chip.

FIG. 4 is a detailed diagram of an example implementation of the DRAM chip 202f of the example memory 104 of FIGS. 2 and 3 showing the row decoder 304 and the column decoder 306 of the DRAM chip 202f working cooperatively to selectively activate particular bitlines of the DRAM chip 202f per memory access. In the illustrated example of FIG. 4, hierarchical wordlines are used to selectively activate portions of rows or wordlines without activating portions of the row that do not include data of interest (e.g., selectively activate the wordline segment 208f of the row 308 as shown in FIG. 3).

In the illustrated example of FIG. 4, two rows (or wordlines) 308 and 402 of the DRAM chip 202f are shown. Each row 308 and 402 includes a main wordline (MWL) and controlling sub-wordlines (SWL). In some example implementations, the MWL's are formed in first-level metal and the SWLs are formed in a poly layer. In the illustrated example, access to the row 308 is enabled through assertion of a MWL0 line 404 and access to the row 402 is enabled through assertion of a MWL1 line 406. The SWL's connect to memory bit cells in different memory cell arrays. In the illustrated example, a SWL 408 connects to the wordline segment 208f of FIGS. 2 and 3 to enable selectively activating the wordline segment 208f to transfer its bits to the data I/O buffer 314.

To enable activating the SWLs, the DRAM chip 202f of the illustrated example is provided with region select (RX) 'AND' gates, one of which is denoted by reference numeral 410. In addition, the DRAM chip 202f is provided with SWL 'AND' gates, one of which is denoted by reference numeral 412. The RX 'AND' gates (e.g., RX-0, RX-1, RX-N) and the SWL 'AND' gates enable selecting particular SWLs within respective columns of memory arrays. Although 'AND' gates are shown in the illustrated example, other logic gates such as 'NOR' gates can be used instead. In examples employing NOR gates, the signal polarities of MWL and RX signal lines are inverted to operate with the 'NOR' gates. In the illustrated example, a first input of the SWL 'AND' gate 412 is connected to the RX-N 'AND' gate 410 and a second input of the SWL 'AND' gate 412 is connected to the MWL0 line 404. In addition, the output of the SWL 'AND' gate 412 is connected to the SWL 408 to activate the SWL 408 upon assertion of the MWL0 line 404 and the output of the RX-N 'AND' gate 410. The other SWL 'AND' gates of the DRAM chip 202f are connected in an analogous manner so that any one of the SWLs of the DRAM chip 202f can be selected for outputting based on selecting a corresponding combination of an RX 'AND' gate (e.g., the RX-N 'AND' gate 410) and a MWL (e.g., the MWL0 line 404).

As shown in FIG. 4, the MWL0 line 404 and the MWL1 line 406 are connected to the row decoder 304, and the RX 'AND' gates are connected to the column decoder 306. In an example implementation that uses 15 bits for row addresses, the row decoder 304 can decode the selection of up to 32,768 MWLs. In an example implementation that uses 11 bits for column addresses, the inputs of the RX 'AND' gates can be connected to the least significant 7 bits of the column address interface of the column decoder 306 to enable individual selection of any one of up to 128 SWLs. In the illustrated example, when the row decoder 304 asserts a high signal on the MWL0 line 404 and the address output by the column decoder 306 selects the RX-N 'AND' gate 410, the inputs of the SWL 'AND' gate 412 are both high, causing the output of the SWL 'AND' gate 412 to activate the wordline segment 310 for outputting its bits onto the data I/O buffer 314.

In the illustrated example of FIG. 4, the MWL0 line 404 and the MWL1 line 406 are loaded only by a few SWL 'AND' gates, which significantly reduces the capacitance on the MWLs and, thus, their signal propagation delays. When only a subset of the CAS address is used to trigger RX signals associated with the RX 'AND' gates as discussed above, the activation area and wordline/bitline energy is advantageously reduced (e.g., less address lines are routed). In addition, energy is also advantageously conserved because the MWLs are not directly connected to the memory cells. As a result of not being directly connected to the memory cells, activation of an MWL across a memory array does not result in destruction of data, because only a small subset of memory cells (e.g., the wordline segment 208f) connected to the active SWL read their data out.

In some example implementations, it may be die-area prohibitive or cost-prohibitive to provide the quantity of 'AND' gates (e.g., SWL 'AND' gates and RX 'AND' gates) to enable a single cache line per access. In such example implementations, less 'AND' gates can be provided with the tradeoff in energy required to activate and read out more cache lines per access. For example, the DRAM chip 202f depicted in FIG. 4 can be implemented with less 'AND' gates to instead read out 16 cache lines per access (e.g., the SWLs become 16 times longer between 'AND' gates). Such an example implementation still produces relatively high energy savings over known DRAM chips.

Figure 5:
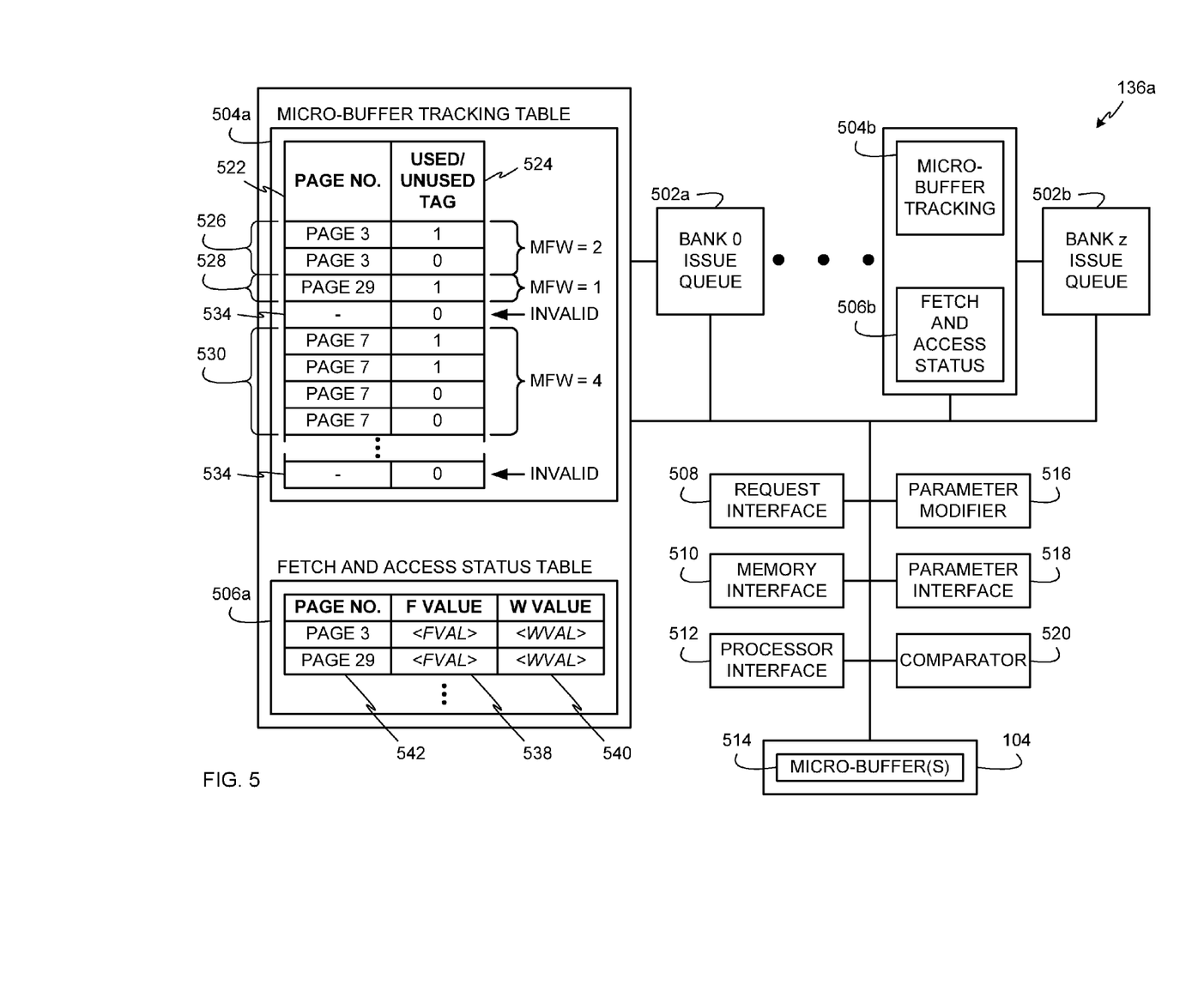
FIG. 5 is a block diagram illustrating any of the example apparatus of FIG. 1 that may be used to determine and use dynamic MFWs to access memory contents in accordance with examples disclosed herein.

FIG. 5 is a block diagram illustrating an example implementation of the example apparatus 136a of FIG. 1. The example apparatus 136a may be used to determine and use dynamic MFWs to access memory contents in the memory 104 of FIG. 1. In the illustrated example of FIG. 5, the example apparatus 136a includes example bank issue queues 502a-b, example micro-buffer tracking tables 504a-b, example fetch and access status tables 506a-b, an example request interface 508, an example memory interface 510, an example processor interface 512, an example parameter modifier 516, an example parameter interface 518, and an example comparator 520. While an example manner of implementing the apparatus 136a and 136b is illustrated in FIG. 5, one or more of the elements, processes and/or devices illustrated in FIG. 5 may be combined, divided, re-arranged, omitted, eliminated and/or implemented in any other way. Further, the bank issue queues 502a-b, the micro-buffer tracking tables 504a-b, the fetch and access status tables 506a-b, the request interface 508, the memory interface 510, the processor interface 512, the parameter modifier 516, the parameter interface 518, and the comparator 520, and/or, more generally, the example apparatus 136a and 136b of FIG. 5 may be implemented by hardware, software, firmware and/or any combination of hardware, software and/or firmware. Thus, for example, any of the bank issue queues 502a-b, the micro-buffer tracking tables 504a-b, the fetch and access status tables 506a-b, the request interface 508, the memory interface 510, the processor interface 512, the parameter modifier 516, the parameter interface 518, and the comparator 520, and/or, more generally, the example apparatus 136a and 136b could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus and/or system claims of this patent are read to cover a purely software and/or firmware implementation, at least one of the bank issue queues 502a-b, the micro-buffer tracking tables 504a-b, the fetch and access status tables 506a-b, the request interface 508, the memory interface 510, the processor interface 512, the parameter modifier 516, the parameter interface 518, and/or the comparator 520 is hereby expressly defined to include a tangible computer readable medium such as a memory, DVD, CD, etc. storing the software and/or firmware. Further still, the example apparatus 136a and 136b illustrated in FIG. 5 may include one or more elements, processes and/or devices in addition to, or instead of, those illustrated in FIG. 5, and/or may include more than one of any or all of the illustrated elements, processes and devices.

In the illustrated example, the example apparatus 136a is shown communicatively coupled to example micro-buffer(s) 514 in the memory 104 of FIGS. 1-3. The example micro-buffer(s) 514 form a sub-set of a row buffer (e.g., the row buffer(s) 206e-h of FIG. 2) in the memory 104 (e.g., DRAM). If a micro-buffer 514 has valid content corresponding to a memory request, then the requested data can be read from the micro-buffer 514 rather than needing to activate bitlines to read the data from corresponding memory cells.

The example memory controller 108a of FIG. 1 controls operations of the DRAM memory 104 of FIG. 1. As part of such control, the apparatus 136a of FIGS. 1 and 5 is provided to facilitate dynamically determining MFWs and using such dynamic MFWs to access the memory 104. In the illustrated example of FIG. 5, the apparatus 136a is provided with bank issue queues 502a-b to queue requests for read and/or write accesses to the memory 104. In the illustrated example, the memory controller 108a uses a First Ready First Come First Serve (FR-FCFS) policy to schedule requests in the bank issue queues 502a-b for the banks (e.g., the banks 302 of FIG. 3) by prioritizing requests to the currently open memory page. In examples that supports multiple MFWs, cache lines from up to 128 different memory pages can be in a row buffer (e.g., the row buffer 206f of FIGS. 2 and 3). Thus, the memory controller 108a of the illustrated example of FIG. 1 tracks all the open cache lines to take advantage of the open page policy. The example memory controller 108a tracks open cache lines by maintaining 128 tags for each DRAM bank. In some examples, while scheduling requests for use with dynamic MFW implementations, searching the bank issue queues 502a-b for all open cache lines in a row buffer may not be feasible. In such examples, a First Come First Serve (FCFS) policy is used to queue memory access requests.

The micro-buffer tracking tables 504a-b (i.e., micro-buffer tracking data structures) of the illustrated example are provided to track when data fetched and stored in the micro-buffers 514 is used (e.g., accessed for sending to the core(s) 106a-b of FIG. 1). In the illustrated example, the memory 104 is provided with the micro-buffers 514 to store data fetched from memory cells (e.g., the portions 204 of the rows of FIG. 2) of the memory 104 (FIGS. 1-3). For each bank (e.g., the banks 302 of FIG. 3) with a row-buffer size of 8 KB, the memory 104 maintains 128 64-byte micro-buffers (e.g., the micro-buffers 514) in a row buffer (e.g., the row buffers 206e-h of FIG. 2). The micro-buffer tracking tables 504a-b associate memory page numbers 522 and corresponding used/unused tags 524 with each micro-buffer 514. The memory page numbers 522 of the illustrated example correspond to the most recent data fetched from the memory 104 and stored in the micro-buffers 514. Each used/unused tag 524 is a bit indicating whether fetched data from a corresponding memory page has been used since it was fetched from memory cells of the memory 104 and stored in the micro-buffer(s) 514.

In the illustrated example of FIG. 5, the micro-buffer tracking table 504a is shown tracking pages corresponding to three memory references. In examples disclosed herein, memory references are included in memory access requests and are used to identify sources (e.g., cores or process threads) of memory access requests made to memory controllers (e.g., the memory controllers 108a-b of FIG. 1) from cores (e.g., the cores 106a-b of FIG. 1). In FIG. 5, a first memory reference corresponds to memory page 3 micro-buffer tracking entries 526, a second memory reference corresponds to a memory page 29 micro-buffer tracking entry 528, and a third memory reference corresponds to memory page 7 micro-buffer tracking entries 530. In the illustrated example, the memory page 3 micro-buffer tracking entries 526 have a MFW equal to two (MFW=2), the memory page 29 micro-buffer tracking entry 528 has a MFW equal to one (MFW=1), and the memory page 7 micro-buffer tracking entries 530 have a MFW equal to four (MFW=4). The micro-buffer tracking table 504a of the illustrated example is also shown as having two invalid entries 534 into which valid data from the memory 104 has not been stored. In some examples, an entry in the micro-buffer tracking table 504a is indicated as invalid by storing an otherwise unlikely or impossible page number identifier value for a corresponding page number 522 of the invalid entry in the micro-buffer tracking table 504a. In other examples, an entry in the micro-buffer tracking table 504a is indicated as invalid by the use of an additional valid/invalid tag bit field (not shown) in the micro-buffer tracking table 504a.

When a memory access request having a memory reference associated with MFW=n is made by one of the cores 106a-b of FIG. 1 to address (A), the comparator 520 compares the page number for the address (A) against the page numbers 522 stored in the memory page micro-buffer tracking entries 526, 528, and 530. Each cache line request maps to an entry in the micro-buffer(s) 514, which can be identified from the memory reference address. If the page number of the memory reference matches the page number of the corresponding entry in the micro-buffer 514, then the memory access request is a hit (i.e., a hit to the micro-buffers 514). That is, if the page number of the address (A) is three (i.e., page number 3) and if it maps to the first or second entry in the micro-buffer 514 (e.g., noted in the memory page 3 micro-buffer tracking entries 526), then the corresponding memory reference is a hit, meaning that the requested data from address (A) is buffered in the micro-buffer(s) 514 and can be retrieved therefrom rather than needing to fetch the data from the memory cells.

In the illustrated example, used/unused tags 524 are set equal to zero (0) in micro-buffer tracking entries when a new page is activated. When a hit is detected, the parameter modifier 516 updates the used/unused tag 524 of the number of corresponding page number entries equal to the MFW. For example, if the memory reference is for page number 3, first entry, the used/unused tag 524 corresponding to the first entry of the memory page 3 micro-buffer tracking entries 526 is set equal to one (1) as shown in FIG. 5 meaning that it has been accessed from the micro-buffer(s) 514 since it was fetched from the memory 104. Used/unused tags 524 that remain equal to zero (0) in other micro-buffer tracking entries of FIG. 5 mean that they have not been accessed from the micro-buffer(s) 514 since they were fetched from the memory 104. If MFW=1 and the memory reference is for page number 29, the memory page 29 micro-buffer tracking entry 528 is set to one (1) as shown in FIG. 5. In the illustrated example of FIG. 5, two of the four memory page 7 micro-buffer tracking entries 530 are set to one (1) meaning that at least two memory access requests have been made to the memory controller 108a since the data corresponding to the memory page 7 micro-buffer tracking entries 530 has been fetched from memory cells of the memory 104 and stored in the micro-buffer(s) 514.

In the illustrated example, the apparatus 136a is provided with the fetch and access status table 506a to track memory reference counts (Fs) 538 and filled and non-accessed micro-buffer counts (Ws) 540 for respective memory pages 542. The memory pages 542 noted in the fetch and access status table 506a correspond to the memory pages 522 tracked in the micro-buffer tracking table 504a. In the illustrated example, the processor interface 512 sends the memory reference counts (Fs) 538 and the filled and non-accessed micro-buffer counts (Ws) 540 from the fetch and access status table 506a to the cores 106a-b of FIG. 1 for storing as the memory reference counts (Fs) 130 and the filled and non-accessed micro-buffer counts (Ws) 132, respectively, of the TLBs 112a-b. In this manner, an OS and/or application(s) executing on the core(s) 106a-b can use the memory reference counts (Fs) 130 and the filled and non-accessed micro-buffer counts (Ws) 132 to determine the dynamic MFW 128 (FIG. 1). In the illustrated example, the parameter modifier 516 determines the memory reference counts (Fs) 538 and the filled and non-accessed micro-buffer counts (Ws) 540, and the parameter interface 518 stores and retrieves the memory reference counts (Fs) 538 and the filled and non-accessed micro-buffer counts (Ws) 540 to/from the fetch and access status table 506a.

Although the fetch and access status table 506a show the memory reference counts (Fs) 538 and the filled and non-accessed micro-buffer counts (Ws) 540 for use in the illustrated example for determining the MFWs 128 of FIG. 1, in other examples additional or alternative types of parameters may be useful for determining the MFWs 128. Such additional or alternative parameters may include the total number of bytes fetched from DRAM cells, the number of read stalls; or the mean depth of the bank issue queues 502a-b.

Although the micro-buffer tracking table 504b and the fetch and access status table 506b are not shown in detail, the micro-buffer tracking table 504b is substantially similar or identical to the micro-buffer tracking table 504a and the fetch and access status table 506b is substantially similar or identical to the fetch and access status table 506a. In the illustrated example, the micro-buffer tracking table 504a and the fetch and access status table 506a are used in connection with memory access requests made via the bank 0 issue queue 502a, and the micro-buffer tracking table 504b and the fetch and access status table 506b are used in connection with memory access requests made via the bank issue z queue 502b.

The request interface 508 of the illustrated example is provided to retrieve memory access requests from the bank issue queues 502a-b. In addition, the request interface 508a parses the information in the memory access requests to identify memory references, addresses, memory pages, and MFWs. In the illustrated example, the core(s) 106a-b send MFW values (e.g., the MFW 128 from the TLB(s) 112a-b) with memory access requests so that the memory controller(s) 136a-b can access the memory 104 using most recently updated MFWs for respective memory pages.

The memory interface 510 of the illustrated example is provided to access the memory 104 (FIG. 1) to read and/or write data from/to the memory 104. In the illustrated example, the memory interface 510 causes the memory 104 to partially activate lines or portions of the memory as described above in connection with FIGS. 2-4 to retrieve data based on dynamic MFWs.

Figure 6:
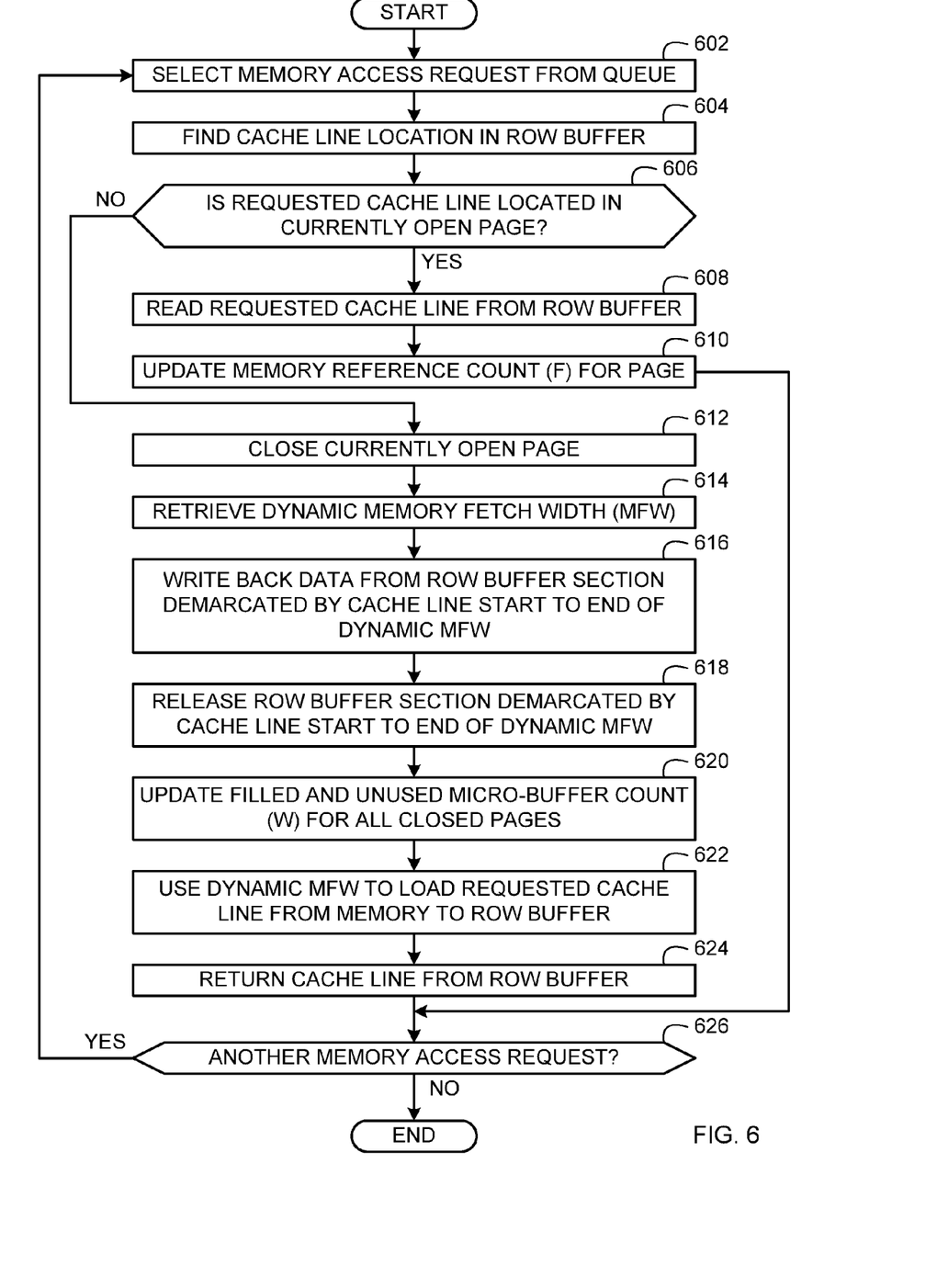
FIG. 6 is a flow diagram representative of example machine readable instructions to use dynamic MFWs to access memory contents.
Figure 7A:
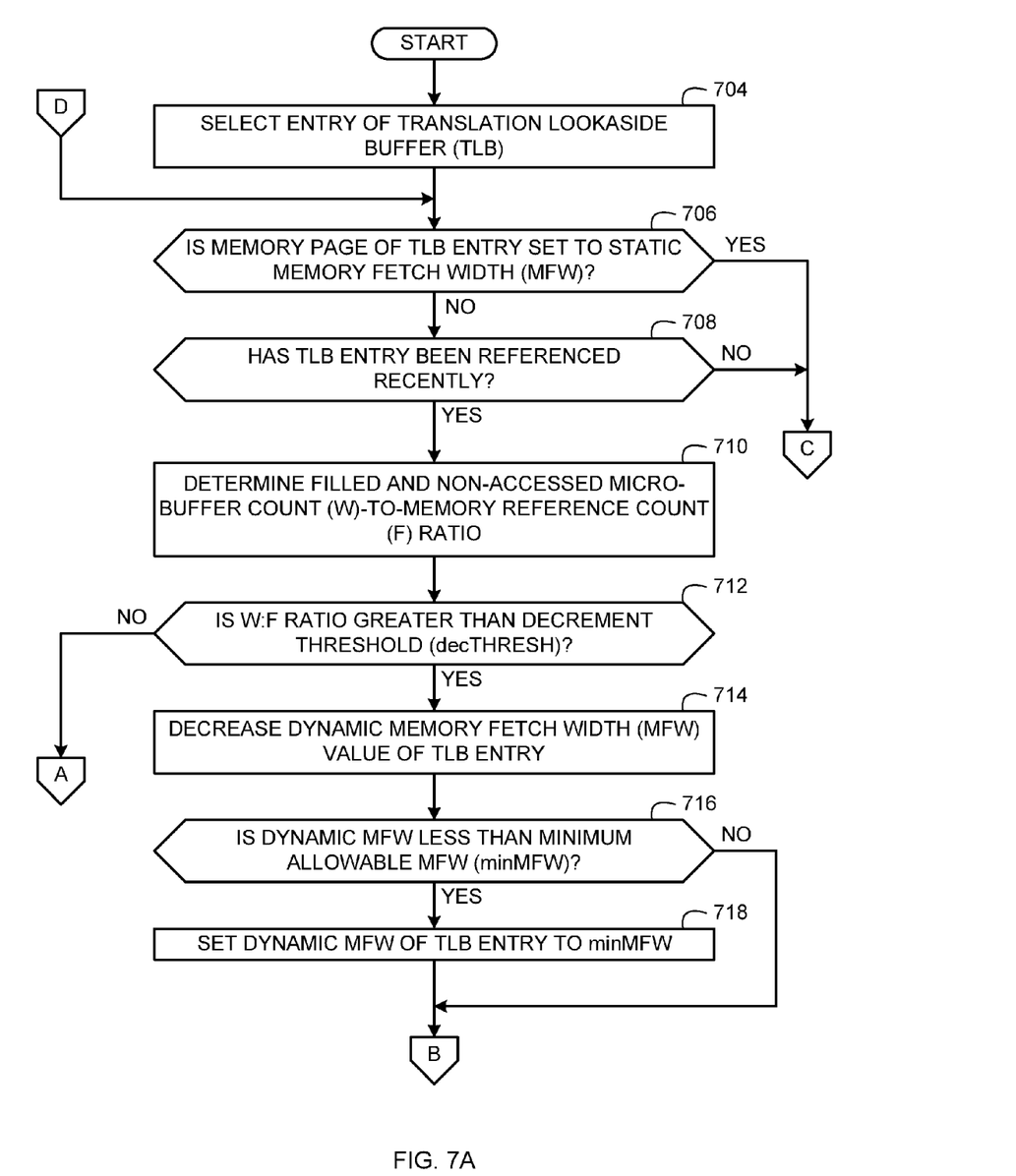
FIGS. 7A and 7B are a flow diagram representative of example machine readable instructions to determine dynamic MFWs.
Figure 7B:
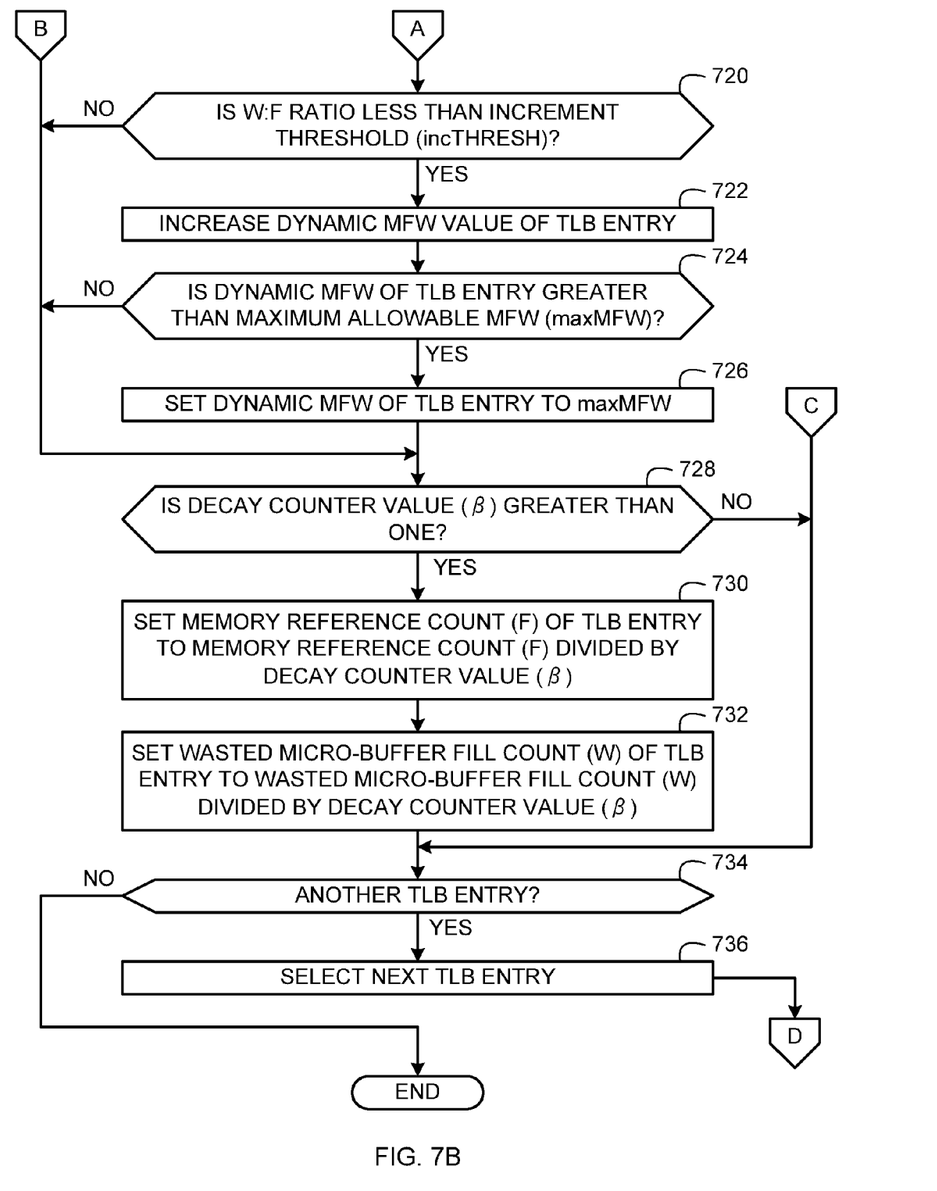

FIG. 6 is a flow diagram representative of example machine readable instructions to use dynamic MFWs (e.g., the MFW(s) 128 of FIG. 1) to access memory contents in the memory 104 (FIG. 1). FIGS. 7A and 7B are a flow diagram representative of example machine readable instructions to determine dynamic MFWs (e.g., the MFW(s) 128 of FIG. 1). For ease of discussion, the example processes of FIGS. 6, 7A, and 7B are described below in connection with the core 106b, the memory controller 108a, and the apparatus 136a of FIGS. 1 and 5. However, the example processes are similarly implemented using the other core 106a, the memory controller 108b, and the apparatus 136b of FIG. 1.

The example processes of FIGS. 6, 7A, and 7B may be implemented using machine readable instructions that, when executed, cause a device (e.g., a programmable controller, processor (e.g., the multi-core processor 100 of FIG. 1), or other programmable machine or integrated circuit) to perform the operations shown in FIGS. 6, 7A, and 7B. For instance, the example processes of FIGS. 6, 7A, and 7B may be performed using a processor, a controller, and/or any other suitable processing device. For example, the example processes of FIGS. 6, 7A, and 7B may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example processes of FIGS. 6, 7A, and 7B may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 6, 7A, and 7B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 6, 7A, and 7B may be implemented as any combination(s) of any of the foregoing techniques, for example, any combination of firmware, software, discrete logic and/or hardware.

Although the example processes of FIGS. 6, 7A, and 7B are described with reference to the flow diagrams of FIGS. 6, 7A, and 7B, other methods of implementing the processes of FIGS. 6, 7A, and 7B may be employed. For example, the order of execution of the blocks may be changed, and/or some of the blocks described may be changed, eliminated, subdivided, or combined. Additionally, one or both of the example processes of FIGS. 6, 7A, and 7B may be performed sequentially and/or in parallel by, for example, separate processing threads, processors, devices, discrete logic, circuits, etc.

Turning to FIG. 6, the apparatus 136a uses dynamic MFWs (e.g., the MFW(s) 128 of FIG. 1) to access memory contents in the memory 104 (FIG. 1). Initially, the request interface 508 (FIG. 5) selects a memory access request (e.g., a read request) from the bank 0 issue queue 502a (block 602). In the illustrated example, the request interface 508 parses the memory access request to identify the MFW (e.g., the MFW 128), a memory reference (e.g., a memory reference corresponding to a requesting core and/or process thread), and the address (A) of the memory location to which access is requested. The memory interface 510 (FIG. 5) finds the cache line location of a requested cache line in a row buffer (block 604). For example, the memory interface 510 finds the cache line location in the row buffer 206e-h (FIG. 2) based on the address (A) from the memory access request.

The memory interface 510 determines whether the requested cache line is located in the currently open memory page (block 606). That is, the contents in a row buffer correspond to a currently open memory page, and the memory interface 510 determines whether the requested cache line is in the row buffer if the contents of the cache line location found at block 604 correspond to the address (A) from the memory access request. If the requested cache line is located in the currently open memory page (block 606), the memory interface 510 reads the requested cache line from the row buffer (block 608). The parameter modifier 516 updates the memory reference count (F) 538 (FIG. 5) for the currently open memory page (block 610).

If the requested cache line is not located in the currently open memory page (block 606), the memory interface 510 closes the currently open memory page (block 612). The memory interface 510 retrieves the dynamic MFW 128 from the request interface 508 (block 614) and writes back the data from the row buffer section demarcated by the cache line start bit location (e.g., corresponding to the address (A)) to the end of the dynamic MFW 128 (block 616). For example, if the cache line start address is 0x0100h and the dynamic MFW 128 is two (e.g., two 32-bit words), the memory interface 510 writes back data from the row buffer that corresponds to bit locations 0x0100h through 0x0108h (i.e., write-back locations=(A)+0x0008h, where (A)=address 0x0100h, and 0x0008h corresponds to two 32-bit words in byte-addressable address locations). The memory interface 510 then releases or frees the row buffer section demarcated by the cache lines start and the end of the dynamic MFW 128 (block 618).

The parameter modifier 516 updates the filled and non-accessed micro-buffer counts (Ws) 540 (FIG. 5) for all the closed memory pages (block 620). For example, for all the memory pages noted in the micro-buffer tracking table 504a and that are currently closed, the parameter modifier 516 checks the used/unused tags 524 to determine which are noted as zero (0). For those memory pages having a used/unused tag 524 set to zero (0), the parameter modifier 516 increments a corresponding one of the filled and non-accessed micro-buffer counts (Ws) 540 in the fetch and access status table 506a.

The memory interface 510 uses the dynamic MFW 128 to load/read the requested cache line from the memory 104 into the row buffer 206e-h (block 622). The processor interface 512 then returns the requested cache line from the row buffer 206e-h to a requesting one of the cores 106a-b of FIG. 1 (block 624). The apparatus 136a determines whether another memory access request is pending (block 626). For example, the apparatus 136a may poll the bank issue queue(s) 502a-b (FIG. 5) to determine whether any other memory access requests are waiting to be serviced. If another memory access request is pending, control returns to block 602. Otherwise, the example process of FIG. 6 ends.

Turning to FIGS. 7A and 7B, the illustrated example process may be used to determine dynamic MFWs (e.g., the MFW(s) 128 of FIG. 1). The example process of FIGS. 7A and 7B is only an example manner useful to dynamically determine different values for the MFW(s) 128. In some examples, other manners of dynamically determining values for the MFW(s) 128 may be employed. In the illustrated example, the example process of FIGS. 7A and 7B is performed periodically at a rate suitable to update the dynamic MFWs 128 at a rate (e.g., once every millisecond, once every second, etc.) that keeps the MFWs 128 relevant to the performance of the OS and/or application(s) executing on the core 106b. The example process of FIGS. 7A and 7B is described as being implemented at the core 106b of FIG. 1 using the TLB interface 142, the ratio determiner 144, the parameter interface 146, and the comparator 148 of FIG. 1 implemented as one or more logic circuits in the core 106b and/or as machine readable instructions executed on the core 106b and accessible to an OS and/or an application also executing on the core 106b. In other example implementations, the example process of FIGS. 7A and 7B is implemented substantially similarly or identically in the core 106a, in the apparatus 136a of the memory controller 108a, and/or in the apparatus 136b of the memory controller 108b.

Initially, the TLB interface 142 selects an entry of the TLB 112b (block 704) (FIG. 7A). The TLB interface 142 determines whether the memory page of the selected TLB entry is set to a static MFW (block 706). If the selected TLB entry is set to a static MFW, control advances to block 734 of FIG. 7B. Otherwise, if the selected TLB entry is not set to a static MFW, the TLB interface 142 determines whether the TLB entry has been referenced recently (block 708). For example, the TLB interface 142 may determine whether the entry has been recently accessed based on a recent access bit or similar bit in the control bits 124 (FIG. 1). If the selected TLB entry has not been recently referenced, control advances to block 734 of FIG. 7B. Otherwise, if the selected TLB entry has been recently referenced, the ratio determiner 144 determines a filled and non-accessed micro-buffer count (W)-to-memory reference count (F) ratio (i.e., a W:F ratio) (block 710) for the memory page of the selected TLB entry. For example, the ratio determines 144 retrieves the filled and non-accessed micro-buffer count (W) 132 and the memory reference count (F) 130 from the TLB 112b for the memory page of the selected TLB entry and determines the W:F ratio based on the retrieved values.

The comparator 148 determines whether the W:F ratio is greater than a decrement threshold (decTHRESH) (block 712). In the illustrated example, when the W:F ratio is greater than the decrement threshold (decTHRESH), a corresponding MFW 128 is decreased. In some examples, the decrement threshold (decTHRESH) is selected to control the maximum value of the MFW 128 in such a way that minimizes latency associated with accessing memory contents from the memory 104 of FIG. 1. If the W:F ratio is greater than the decrement threshold (decTHRESH) (block 712), the parameter modifier 146 decreases the corresponding dynamic MFW 128 (block 714). The comparator 148 determines whether the dynamic MFW 128 is less than a minimum allowable MFW (minMFW) (block 716). In the illustrated example, when the MFW 128 is less than the minimum allowable MFW (minMFW), it is set equal to the minimum allowable MFW (minMFW). In some examples, the value of the minimum allowable MFW (minMFW) is selected so that inadvertent underfetching of data from the memory 104 does not cause an excessive amount of accesses to the memory 104 to retrieve data for a memory access request. If the dynamic MFW 128 is less than the minimum allowable MFW (minMFW) (block 716), the parameter modifier 146 sets the dynamic MFW 128 of the selected TLB entry equal to the minimum allowable MFW (minMFW) (block 718). After setting the dynamic MFW 128 of the selected TLB entry equal to the minimum allowable MFW (minMFW) at block 718 or if the comparator 148 determines that the dynamic MFW is less than the minimum allowable MFW (minMFW) at block 716, control advances to block 728 of FIG. 7B.

If at block 712 the comparator determines that the W:F ratio is not greater than the decrement threshold (decTHRESH), control advances to block 720 of FIG. 7B at which the comparator 148 determines whether the W:F ratio is less than an increment threshold (incTHRESH) (block 720) (FIG. 7B). In the illustrated example, when the W:F ratio is less than the increment threshold (incTHRESH), a corresponding MFW 128 is increased. In some examples, the increment threshold (incTHRESH) is selected to control the minimum value of the MFW 128 in such a way that minimizes a quantity of access to the memory 104 necessary to retrieve requested memory contents from the memory 104 of FIG. 1.

If the W:F ratio is not less than the increment threshold (incTHRESH) (block 720), control advances to block 728. Otherwise, if the W:F ratio is less than the increment threshold (incTHRESH) (block 720), the parameter modifier 146 increases the corresponding dynamic MFW 128 (block 722). The comparator 148 determines whether the dynamic MFW 128 is greater than a maximum allowable MFW (maxMFW) (block 724). In the illustrated example, when the MFW 128 is greater than the maximum allowable MFW (maxMFW), it is set equal to the maximum allowable MFW (maxMFW). In some examples, the value of the maximum allowable MFW (maxMFW) is selected so that inadvertent overfetching of data from the memory 104 does not cause an excessive latency in accessing the memory 104 to retrieve data for a memory access request. If the dynamic MFW 128 is not greater than the maximum allowable MFW (maxMFW) (block 724), control advances to block 728. Otherwise, if the dynamic MFW 128 is greater than the maximum allowable MFW (maxMFW) (block 724), the parameter modifier 146 sets the dynamic MFW 128 of the selected TLB entry equal to the maximum allowable MFW (maxMFW) (block 726).

In the illustrated example of FIGS. 7A and 7B, blocks 728, 730 and 732 are useful to apply a decay rate on the memory reference counts (Fs) 130 and the filled and non-accessed micro-buffer counts (Ws) 132 of FIG. 1 so that the dynamic MFWs 128 can be modified at a suitable rate relevant to current performance needs and/or desires of the OS and/or applications executing on the core 106b. That is, blocks 728, 730 and 732 are useful to decay or lessen the effects of the memory reference counts (Fs) 130 and the filled and non-accessed micro-buffer counts (Ws) 132 when they become old or stale. If the memory reference counts (Fs) 130 and the filled and non-accessed micro-buffer counts (Ws) 132 are remembered for too long without adjusting, the core 106b will be too slow in adapting to changing OS and/or application behavior. If the memory reference counts (Fs) 130 and the filled and non-accessed micro-buffer counts (Ws) 132 are zeroed or forgotten too quickly, the dynamic MFW 128 may be changed abruptly based on short-term outlying noise. Blocks 728, 730 and 732 facilitate decaying the memory reference counts (Fs) 130 and the filled and non-accessed micro-buffer counts (Ws) 132 using an exponentially-weighted moving average (EWMA). That is, on each periodic TLB scan of the illustrated example, the parameter optimizer 146 decays the memory reference counts (Fs) 130 and the filled and non-accessed micro-buffer counts (Ws) 132 based on an EWMA decay counter value ($\beta$). For example, the comparator 148 determines whether the EWMA decay counter value ($\beta$) is greater than one (1) (block 728). If the EWMA decay counter value ($\beta$) is not greater than one (1), control advances to block 734. Otherwise, if the EWMA decay counter value ($\beta$) is greater than one (1), the parameter modifier 146 sets the memory reference count (F) 130 equal to the memory reference count (F) 130 divided by the EWMA decay counter value ($\beta$) (block 730). In addition, the parameter modifier 146 sets the filled and non-accessed micro-buffer counts (W) 132 equal to the filled and non-accessed micro-buffer counts (W) 132 divided by the EWMA decay counter value ($\beta$) (block 732).

The TLB interface 142 determines whether there is another TLB entry in the TLB 112b to process (block 734). If there is another TLB entry to process, the TLB interface 142 selects the next TLB entry (block 736), and control returns to block 706 of FIG. 7A. Otherwise, if there is not another TLB entry to process, the examples process of FIGS. 7A and 7B ends.

Although the above discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods, apparatus, and articles of manufacture, the examples provided are not the only way to implement such methods, apparatus, and articles of manufacture. Thus, although certain methods, apparatus, and articles of manufacture have been described herein, the scope of coverage of this patent is not limited thereto. To the contrary, this patent covers all methods, apparatus, and articles of manufacture fairly falling within the scope of the claims either literally or under the doctrine of equivalents.

What is claimed is:

1. A method to access a memory, the method comprising:
   receiving at least one runtime characteristic associated with accesses to contents of a memory page;
   dynamically adjusting a memory fetch width for accessing the memory page based on the at least one runtime characteristic, wherein the at least one runtime characteristic is a filled and non-accessed micro-buffer count; and
   storing the filled and non-accessed micro-buffer count, a memory reference count, and a memory fetch width in a translation lookaside buffer table entry corresponding to the memory page.

2. A method as defined in claim 1, wherein dynamically adjusting the memory fetch width is performed by at least one of a memory controller, an operating system, or an application.

3. A method as defined in claim 1, further comprising receiving the memory reference count, the filled and non-accessed micro-buffer count indicative of a quantity of data units filled in a micro-buffer and not accessed from the micro-buffer, and the memory reference count indicative of a quantity of fetches from the memory page, wherein dynamically adjusting the memory fetch width comprises:
   for the memory page, determining a ratio of the filled and non-accessed micro-buffer count to the memory reference count;
   if the ratio is greater than a first threshold, decreasing the memory fetch width; and
   if the ratio is less than a second threshold, increasing the memory fetch width.

4. A method as defined in claim 1, further comprising, when the memory fetch width is decreased, if the memory fetch width is less than a first threshold allowable memory fetch width, setting the memory fetch width to the first threshold allowable memory fetch width.

5. A method as defined in claim 1, further comprising, when the memory fetch width is increased, if the memory fetch width is greater than a second threshold allowable memory fetch width, setting the memory fetch width to the second threshold allowable memory fetch width.

6. A method as defined in claim 1, wherein dynamically adjusting the memory fetch width comprises at least one of:
decreasing the memory fetch width by dividing the memory fetch width by a constant factor, or
increasing the memory fetch width by multiplying the memory fetch width by the constant factor.

7. A method as defined in claim 1, further comprising:
determining whether the memory fetch width is set to a static value; and
adjusting the memory fetch width when it is determined that the memory fetch width is not set to the static value.

8. A method as defined in claim 7, wherein the static value is settable by an operating system or an application executing on a processor in communication with the memory controller.

9. A tangible machine accessible medium having instructions stored thereon that, when executed, cause a machine to at least:
for a memory page, determine a ratio of a filled and non-accessed micro-buffer count to a memory reference count, the filled and non-accessed micro-buffer count indicative of a quantity of data units filled in a micro-buffer and not accessed from the micro-buffer, and the memory reference count indicative of a quantity of fetches from the memory page;
if the ratio is greater than a first threshold, decrease a memory fetch width;
if the ratio is less than a second threshold, increase the memory fetch width; and
store the filled and non-accessed micro-buffer count, the memory reference count, and the memory fetch width in a translation lookaside buffer table entry corresponding to the memory page.

10. A machine accessible medium as defined in claim 9 having instructions stored thereon that, when executed, cause the machine to, when the memory fetch width is decreased, if the memory fetch width is less than a first threshold allowable memory fetch width, set the memory fetch width to the first threshold allowable memory fetch width.

11. A machine accessible medium as defined in claim 10 having instructions stored thereon that, when executed, cause the machine to, when the memory fetch width is increased, if the memory fetch width is greater than a second threshold allowable memory fetch width, set the memory fetch width to the second threshold allowable memory fetch width.

12. A machine accessible medium as defined in claim 9 having instructions stored thereon that, when executed, cause the machine to:
determine whether the memory fetch width is set to a static value; and
determine the ratio when it is determined that the memory fetch width is not set to the static value.

* * * * *